July 17, 1956 W. C. SPEED ET AL 2,755,029

MULTIPLE WINDING SPOOL FOR PRODUCTION OF MAGNETIC SOUND TAPE

Filed Dec. 21, 1950 2 Sheets-Sheet 1

INVENTORS
William C. Speed
James J. Dwyer
BY
Pennie, Edmonds, Morton & Barrows
ATTORNEYS

MULTIPLE WINDING SPOOL FOR PRODUCTION OF MAGNETIC SOUND TAPE

Filed Dec. 21, 1950 2 Sheets-Sheet 2

William C. Speed
James J. Dwyer
INVENTOR
BY
Pennie, Edmonds, Morton & Barrows
ATTORNEYS United States Patent Office 2,755,029

Patented July 17, 1956

2,755,029

MULTIPLE WINDING SPOOL FOR PRODUCTION OF MAGNETIC SOUND TAPE

William C. Speed, Riverside, and James J. Dwyer, Stamford, Conn., assignors to Audio Devices, Inc., New York, N. Y., a corporation of New York Application December 21, 1950, Serial No. 201,989

8 Claims. (Cl. 242—55)

This invention relates to the production of magnetic recording tape and has for its object more particularly improvements in the method of and apparatus for winding a plurality of pieces of cut tape simultaneously into separate rolls.

This application contains subject matter also disclosed in copending applications, Serial Nos. 201,985 now Patent No. 2,645,270 and Reissue No. 23,875 and 201,986, now Patent No. 2,702,581 filed simultaneously herewith, which disclose a method of and apparatus for advancing tape base, coated solely on one side with finely divided magnetic material, from a roll in a charging zone to a main cutting or slitting zone; and the tape base is cut lengthwise into a plurality of narrow pieces of tape as it moves through the cutting zone. The pieces of tape are gripped and advanced through a gripping zone and are separated and spaced from one another in a separating-spacing zone; after which the spaced pieces of tape move into a winding zone where they are wound simultaneously into separate rolls.

It is desired ordinarily to wind the pieces of tape quickly, as fast as the tape base can be cut or slit into the narrow pieces. They are wound at the same time on a plurality of hubs mounted on a power driven shaft. The hubs may be such per se; that is, they are not provided with side flanges to contain the roll of tape, and are essentially a core on which the tape is wound. A piece of tape is wound on a hub and as the amount of wound tape increases the size of the roll increases, its sides being fully exposed and unprotected. The hubs may also form the central or core part of reels; that is, they are provided with side flanges secured integrally thereto or with removable side flanges secured temporarily thereto. A bank or plurality of hubs, with or without such side flanges, is mounted on the shaft; the number of hubs in the bank being the same as the number of pieces of tape to be wound. The present application is confined to improvements in the method of and apparatus for conducting the tape winding operation.

In accordance with the invention the pieces of tape may be quickly wound into rolls on a bank of hubs; the winding step need be stopped only a very short time to remove the bank of hubs plus rolls and to place another bank of hubs in position for the winding of another batch of rolls; and the operation may be resumed promptly.

These and other features of the invention will be better understood by referring to the accompanying drawings, taken in conjunction with the following description, in which.

Figures 1, 2, 3:
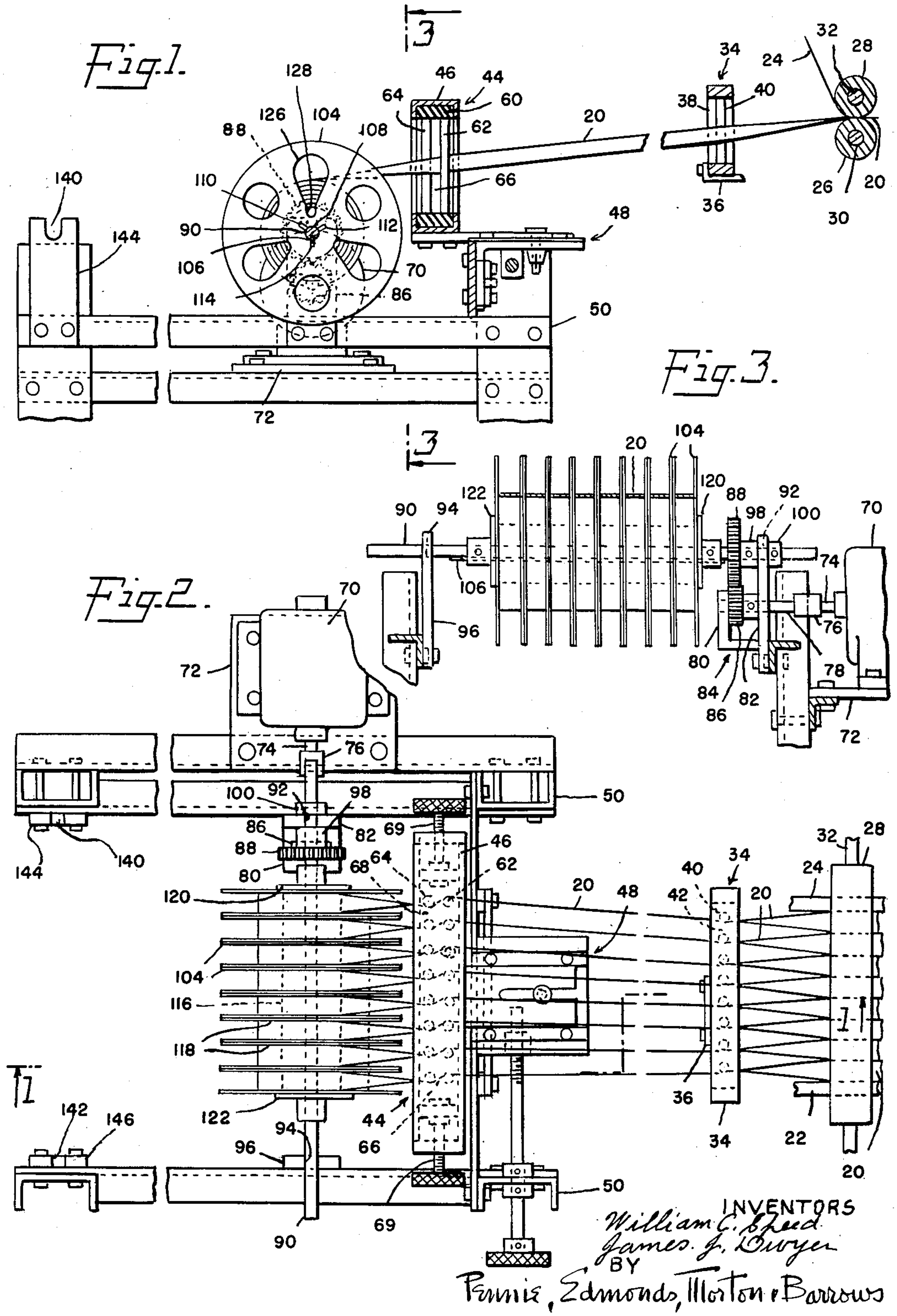
Fig. 1 is a side elevation in section on the line 1—1 of Fig. 2, showing an apparatus illustrative of a practice of the invention.
Fig. 2 is a plan view.
Fig. 3 is an end view on the line 3—3 of Fig. 1.

Referring to Figs. 1 and 2, a plurality of pieces of tape 20 cut or slit from a tape base coated solely on one side with finely divided magnetic material and outer marginal edge portions 22 and 24 of the tape base, from a cutting or slitting zone, not shown, pass flatly through a pair of gripping rollers 26 and 28, mounted integrally on lower and upper shafts 30 and 32, the latter of which is power driven. The outer marginal edge portions are discarded. The inner pieces only are retained and further processed in accordance with the present invention. In a present practice a tape base six inches wide is cut into twenty-two pieces of tape, not including the discarded marginal edge portions.

The pieces of tape are passed from the gripping rollers through a first separator or "comb" 34 formed of a lateral support 36 directly forward of the cutting zone and a vertically disposed rectangular frame 38 securely mounted on the far end of the support, in the normal path of travel of the pieces of tape. The frame consists of top, bottom and end pieces fastened to each other. A plurality of spaced rods 40, extend vertically of the frame, the lower ends of the rods being secured to the bottom and the upper ends to the top of the frame. The spacing of the rods provides a vertical space 42 between adjacent rods, through which the pieces of tape pass. Since this arrangement of the rods resembles more or less the teeth of a comb, the device is referred to by the operators as a comb.

Whereas the pieces of tape come through the gripping rollers disposed flatly and horizontally, they pass into spaces 42 in sliding contact with the intermediate or mid-portions of the vertical rods in a vertically disposed position. In other words, the pieces of tape are given a half turn as they enter the spaces. The pieces of tape are advanced in this manner to eliminate lash, so that they will not become jammed between the rods, and so that their edges will not rub against the rods, or the top and the bottom of the frame—thus preventing damage to the pieces of tape.

The vertically disposed pieces of tape spread out laterally a limited amount (Fig. 2), and pass to and through a second separator or comb 44, which functions in somewhat the same manner as the first separator or comb, although it differs substantially in construction because of certain highly useful adjustable features that permit it also to function somewhat differently than the first comb, as more fully described in the above-mentioned copending applications, as well as in copending application, Serial No. 201,990, now Patent No. 2,692,736, filed simultaneously herewith. The separator is in the form of a rectangular outer frame 46 secured at its bottom to an adjustable support 48, carried by a base frame 50, the details of which are not here important. The frame may be moved forwardly or backwardly as well as laterally to the left or right.

The second separator or comb also includes an inner frame 60 fitting slidably in outer frame 46. The inner frame is formed of a rubber top and bottom and metal ends. A plurality of closely spaced pairs of vertical rods 62 and 64 arranged in two spaced parallel rows, are attached at their ends to the rubber top and bottom. The spacing of the rods results in a vertical space 66 between each pair of rods and a space 68 between adjacent pairs of rods, through which the spieces of tape may pass in a zigzag manner, in sliding contact with the vertical rods. Threaded rods 69 with hand wheels extend through the ends of the outer frame and are rotatably secured to the ends of the inner frame. The construction of the inner frame is such as to make it laterally expansible and contractible by turning the threaded rods. Spaces 68 between adjacent pairs of rods, therefore, are also expansible and contractible.

It will thus be seen that the operator has a good deal of leeway in manipulating the second separator or comb. He can move it laterally to the left or right to adjust its position relative to the first separator or comb as well as to the tape winding or reeling zone; he can also increase or decrease the width of spaces 68 through which the pieces of tape zigzag to the winding zone. As with the first separator or comb, the flat faces of the pieces of tape are passed vertically, rather than horizontally, through spaces 68, the flat faces of each piece of tape thus being brought in zigzag sliding or wiping contact with its pair of vertical rods 62 and 64.

On passing through the second tape separator or comb, the pieces of tape enter the winding or reeling zone. As more particularly shown in Figs. 1, 2 and 3, the apparatus includes a torque motor 70 secured to a bracket 72 attached to base frame 50. Its drive shaft 74 communicates with a coupling 76 connecting with a driven shaft 78 extending through the side of the frame and being supported in bearings in arms 80 and 82 of a bifurcated yoke 84, the base of which is suitably attached to the inside of the base frame at its top. A drive gear 86 is integrally mounted on the shaft inwardly of and adjacent to the left arm 80 of the yoke, as one views Fig. 3.

The drive gear in turn meshes with a driven gear 88 integrally mounted on an upper removable shaft 90 resting by gravity at its right end in a journal slot 92 (Fig. 2), in the upper portion of the right and higher arm 82 of the yoke, and at its left end in a similar journal slot 94 (Fig. 2) in a bracket support 96 secured to the opposite side of the base frame. The shaft is provided (Fig. 3) at its right end with two integrally secured spacers in the form of hub 98 and collar 100 adjacent right arm 82 of the yoke to keep gears 86 and 88 in mesh.

Figures 8, 11, 12:
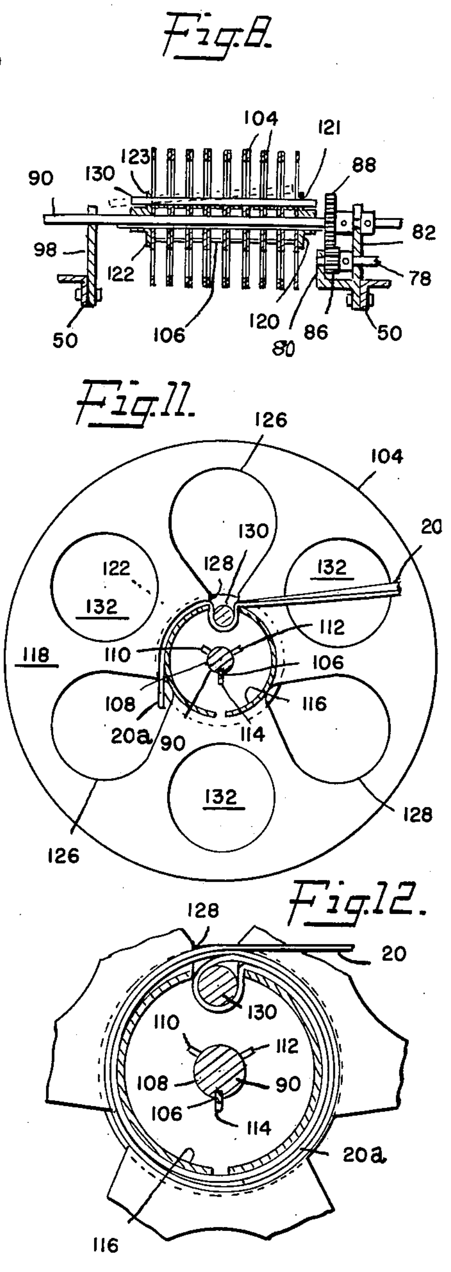

A plurality of reels 104 is mounted on shaft 90. They are kept in alignment (Figs. 3 and 11) and locked on the shaft by a key 106. The shaft itself and its key fit in a corresponding shaft hole 108 and in one of three slots 110, 112 and 114 (the latter as shown in Figs. 1 and 11) in the hub portions 116 of the side walls or flanges 118 of the reels. The reels are also kept in contact with each other on the shaft (Figs. 3 and 2) by a fixed retainer flange or collar 120, with a rod hole 121 (Fig. 8) integrally secured on its right end, adjacent gear 88, and a removable retainer flange or collar 122, with a rod hole 123, on its left end, as one views Figs. 3 and 8.

Referring more especially to Fig. 1, it will be noted that the side walls or flanges 118 of each reel are provided with a pair of complementary pear-shaped holes 126, the lower or smaller ends of which merge into a complementary transverse hub slot 128, extending into the peripheral portions of the hub.

When mounting a plurality of reels 104 on shaft 90, for example as shown in Figs. 2 and 3, they are so placed that hub slots 128 of all of the reels are in alignment with each other. A retaining rod 130 is then inserted through the pear-shaped holes and the far end is pushed into a rod hole of retainer flange 122. The near end of the retaining rod is then pushed into the rod hole of retainer flange 120. The slots are sufficiently deep to accommodate the retaining rod so that its top surface is substantially in circumferential alignment with the exterior surfaces of the hubs in the reels.

In addition to the complementary pear-shaped holes in the side wall or flange of each reel, which holes in all of the reels can be aligned with each other, the flanges of the reels are provided with additional complementary holes 132 which may likewise be aligned. They reduce the weight of the reels and are also in effect peepholes to determine the amount of tape on the reels. They may also be used for the insertion of shears to cut the pieces of tape, as is explained below.

It may be assumed at this stage that reels 104 are mounted on shaft 90; that their slots are aligned at the top; that retainer flanges 120 and 122 are secured to the shaft to hold the reels in contact with each other; and that the operator has placed the shaft in journal slots 92 and 94 (Figs. 2 and 3). The forward ends of the pieces of tape 20 extending beyond second separator or comb 44 are then given a half turn and placed in the reels over their respective hubs and slots. The ends of the pieces of tape extend over the slots preferably several inches.

Retaining rod 130 is then passed laterally through aligned pear-shaped holes 126, over the pieces of tape; its far end is pushed into rod hole 123 of retainer flange 122; the rod is pushed downwardly into hub slots 128, and the near end of the rod is inserted in rod hole 121 of retainer flange 120. This causes a portion of each piece of tape to be pushed downwardly in its hub slot. Since the retaining rod fits fairly tightly in the slots as it bears against the depressed portions of the pieces of tape, it maintains its position as shaft 90 and reels 104 are rotated for the tape winding operation. After a few turns the pieces of tape are securely fastened to the hubs of the reels, and the rod may be withdrawn.

As one views Figs. 1, 11 and 12, the shaft and hence the reels rotate anti-clockwise. When this occurs forward ends **20*a*** of the pieces of tape tend to dangle from their hubs; and the main portions of the pieces of tape are wound against the hub until the reels make a complete revolution, after which the main portions of the pieces of tape bear down on and lock the ends during the second revolution of the reels.

The speed at which the machine is operated depends on a number of factors, including the skill of the operator. If the coated tape base itself is in optimum condition, so that objectionable sections need not be cut out, and splicing for that reason is not required, or if such objectionable sections are few and far apart, the machine itself may be run quite rapidly.

Various procedures may be followed to exchange a set of empty reels for the set of loaded or full reels: For example, the operator may tear or cut the tape base in advance of the main cutting or slitting zone, or he may cut the pieces of tape adjacent the reels. The difficulty with the first procedure is that he must then manually feed the free forward end of the tape base into the main cutting or slitting zone, feed the free forward ends of the cut pieces of tape through the gripping rollers, the two separators or combs, and then secure the ends to the hubs. The difficulty with the second procedure is that the pieces of tape rearward of the reels may spring back, at least through the second separator or comb, thus making it necessary again to string them through the separator and to attach them to another set of reels for winding.

Figures 4, 5, 6, 7, 9, 10:
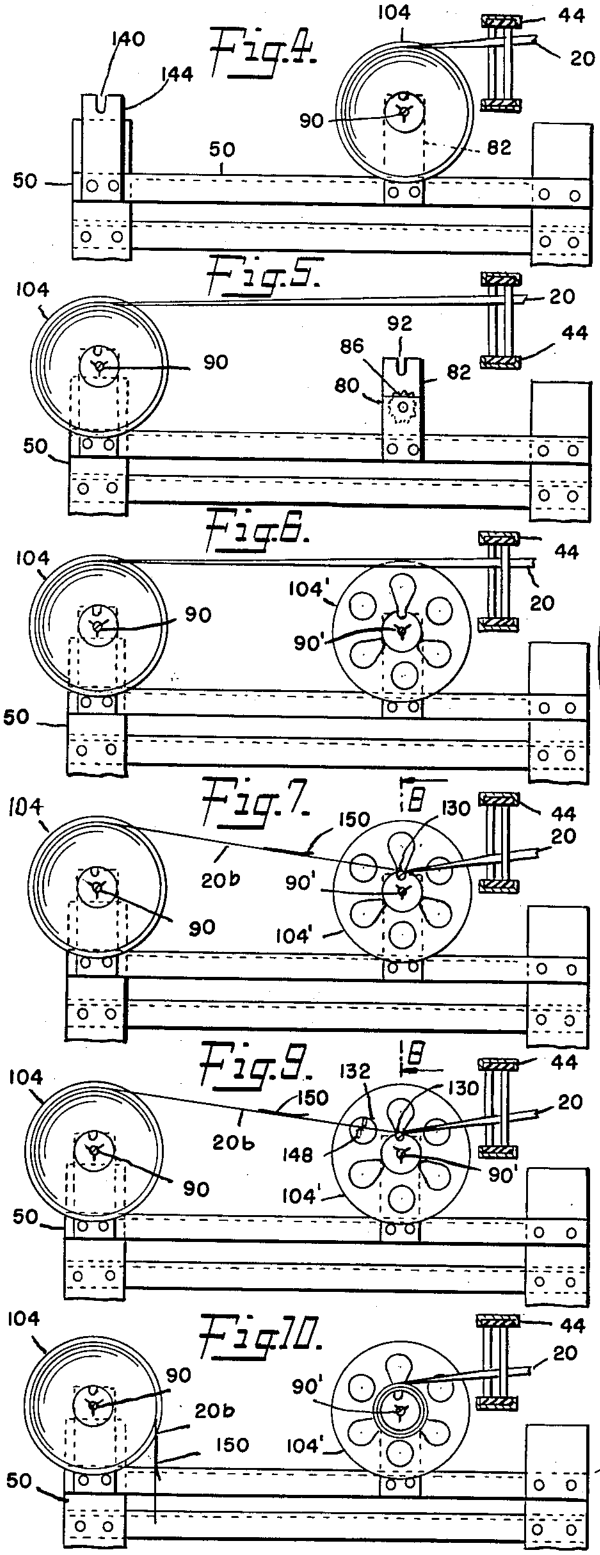
Figs. 4–12 are various views showing how the apparatus may be used in winding the pieces of tape into rolls.

In a presently preferred practice the power driven operation is continued until the reels (Fig. 4) are loaded, after which a switch is thrown to stop the motors. The operator then lifts the entire shaft-reel assembly 90—104, by grasping the ends of shaft 90 (Figs. 2, 3 and 8), lifting it out of journal slots 92 and 94, and placing it in a second pair of journal slots 140 and 142 (Fig. 5) in brackets 144 and 146 (Figs. 1, 2, 4, 5, etc.) attached to the left end of base frame 50. The two sets of journal slots are several feet apart to facilitate the shaft-reel exchange.

Another but empty shaft-reel assembly 90′—104′ (Fig. 6) is then placed in the first pair of journal slots 92 and 94. Retaining rod 130, as before, is pushed downwardly (Fig. 7) across the pieces of tape to lock them onto the hubs of the new set of reels. The operator then cuts all of the pieces of tape across the portions extending from the first set of reels to the second set of reels.

The forward ends of the pieces of tape attached to the hubs of the second set of reels are preferably short. The operator may therefore make his cut by going through the nearest aligned holes 132 in the side flanges of the reels with a pair of shears 148 (Fig. 9), working from both sides of the assembly. The operator then starts the motors; and loading of the new set of reels is started.

The operator's attention is directed next to the first shaft-reel assembly 90—104 mounted in the second set of journal slots 140 and 142. It is turned by hand to take up the tail ends **20*b* of the pieces of cut tape, which may be suitably fastened, for example by a piece of adhesive tape or binder 150**, if desired, to the rolls in the reels; as described in the first-mentioned copending applications.

The assembly is lifted and taken to a work bench for disassembly. Retainer flange 122 (Figs. 2, 3 and 8) is loosened and removed. The loaded reels are then taken from the shaft. A set of empty reels is placed on the shaft; the retainer flange is replaced and tightened; and a new empty shaft-reel assembly is thus provided. It may be substituted later for the one simultaneously being loaded. Shaft-hub instead of shaft-reel assemblies may likewise be employed.

While the production of magnetic sound-recording and sound-reproducing tape has been emphasized, it will be appreciated that the practice of the invention is applicable to the production of a variety of similarly shaped products such as uncoated tape, tape otherwise coated, leaders, bands, ribbons, etc. This may be in connection with the magnetic tape itself such as in the production of leaders to be attached to one or both ends of a piece of magnetic tape. A sheet of the leader material may be cut or slit into a plurality of leaders, passed through the separator and wound into rolls from which pieces are cut, as leaders, as required.

It will be clear to those skilled in this art that the construction shown is by way of example, and that a number of useful modifications may be employed in the practice of the invention.

We claim:

1. In apparatus for producing sound-recording and sound-reproducing magnetic tape by cutting or slitting a relatively long and narrow base coated on one side with finely divided magnetic material into a plurality of more than two pieces of tape as it moves in a predetermined path of travel from a charging device through a cutting or slitting device and the cut pieces of tape move at the same time through a separating-spacing device to a winding device, containing a plurality of hubs, mounted on a power driven shaft, on which they are wound simultaneously into separate rolls, the improvement comprising a plurality of demountable hubs integrally mounted on a removable shaft supportable at its ends in a pair of spaced journals; drive means connectible with one end portion of the shaft for rotating it and the hubs as a unitary whole, each hub being provided with a shaft hole and a transverse recess extending inwardly from its periphery; aligning means on the hubs and the shaft for placing and maintaining the recesses in alignment with each other so that each recess may receive a transverse portion of one of the pieces of tape when pressed therein; and a second pair of spaced journals located forwardly of the first pair of journals to receive said shaft and its hubs as a unitary whole after the rolls of tape are completely wound thereon and before the wound portions of the pieces of tape are severed from the rearwardly extending unwound portions of the pieces.

2. Apparatus according to claim 1, in which the aligning means include a transverse keyway adjacent the shaft hole of each hub, and the shaft is provided with a key extending longitudinally thereof to fit into the keyway to hold the hubs in alignment on the shaft.

3. Apparatus according to claim 1, in which the transverse recess is sufficiently large to accommodate two thicknesses of the tape and a holding rod pressed therein.

4. Apparatus according to claim 1, in which the aligning means include a pair of spaced side flanges on each hub to form a reel; each pair of flanges is provided in turn with aligned holes extending outwardly from their hub toward their periphery; and the inner portion of the flange holes adjacent the hub mesh with the transverse recess in the hub, the recess being adapted to receive a portion of the tape when pressed therein by a rod.

5. Apparatus according to claim 1, in which the drive means are in the form of a gear mounted on the shaft adapted to mesh with and to be driven by a drive gear.

6. Apparatus according to claim 1, in which the shaft is supportable by gravity in the pair of spaced open journals so that the shaft-hub assembly may be freely mounted therein and demounted therefrom.

7. Apparatus according to claim 1, in which the drive means are in the form of a gear mounted on the shaft adapted to mesh with and to be driven by a drive gear; and the shaft is supportable by gravity in the pair of spaced open journals so that the shaft-hub assembly may be freely mounted therein and withdrawn therefrom.

8. Apparatus according to claim 1, in which the hubs are secured on the shaft against lateral movement by a collar at each end of the bank of hubs attached to the shaft; the collar on the free end of the shaft is removable so that the hubs may be mounted thereon and withdrawn therefrom as desired; and the shaft is supportable by gravity in the pair of spaced open journals so that the shaft-hub assembly may be freely mounted therein and withdrawn therefrom.

References Cited in the file of this patent

UNITED STATES PATENTS

| | | |
|---|---|---|
| 524,276 | Hopkins | Aug. 7, 1894 |
| 1,484,842 | Nichols et al. | Feb. 26, 1924 |
| 1,675,863 | Parsons | July 3, 1928 |
| 1,809,660 | Wild et al. | June 9, 1931 |
| 1,871,234 | Proctor | Aug. 9, 1932 |
| 1,912,250 | Borletti | May 30, 1933 |
| 2,177,311 | Weimer | Oct. 24, 1939 |
| 2,226,825 | McAuley | Dec. 31, 1940 |
| 2,272,940 | Gerard | Feb. 10, 1942 |
| 2,321,646 | Blodgett | June 15, 1943 |
| 2,361,264 | Christman | Oct. 24, 1944 |
| 2,361,795 | Roesen | Oct. 31, 1944 |
| 2,385,692 | Corbin et al. | Sept. 25, 1945 |
| 2,423,778 | Johnstone | July 8, 1947 |
| 2,507,144 | Christman | May 9, 1950 |
| 2,561,562 | Collins | July 24, 1951 |
| 2,650,038 | Kievit | Aug. 25, 1953 |